United States Patent [19]

Atsumi et al.

[11] 4,222,783
[45] Sep. 16, 1980

[54] BARIUM TITANATE SERIES CERAMICS HAVING A POSITIVE TEMPERATURE COEFFICIENT OF ELECTRIC RESISTANCE

[75] Inventors: Senji Atsumi, Kagamihara; Shigetaka Wada, Kuwana, both of Japan

[73] Assignee: NGK Insulators, Ltd., Nagoya, Japan

[21] Appl. No.: 6,842

[22] Filed: Jan. 26, 1979

[30] Foreign Application Priority Data

Feb. 6, 1978 [JP] Japan ............................... 53-11413

[51] Int. Cl.$^2$ ............................................. C04B 35/46
[52] U.S. Cl. .............................. 106/73.32; 106/73.2; 252/63.2; 252/63.5; 252/520
[58] Field of Search ........................... 106/73.2, 73.32; 252/63.2, 63.5, 520

[56] References Cited

U.S. PATENT DOCUMENTS

| | | | |
|---|---|---|---|
| 2,836,501 | 5/1958 | Crownover | 106/73.32 |
| 3,373,120 | 3/1968 | Nitta et al. | 106/73.32 |
| 3,472,776 | 10/1969 | Derbyshire | 106/73.31 |
| 3,586,642 | 6/1971 | Matsuo et al. | 106/73.32 |
| 3,666,505 | 5/1972 | Hoffman et al. | 106/73.32 |
| 3,912,527 | 10/1975 | Utsumi et al. | 106/73.32 |
| 3,975,307 | 8/1976 | Matsuo et al. | 106/73.32 |
| 4,055,438 | 10/1977 | Wada et al. | 106/73.32 |

*Primary Examiner*—O. R. Vertiz
*Assistant Examiner*—Mark Bell
*Attorney, Agent, or Firm*—Stevens, Davis, Miller & Mosher

[57] ABSTRACT

Barium titanate series semiconductive ceramics having a positive temperature coefficient of electric resistance are disclosed. The ceramics consist mainly of a barium titanate series compound and contain specifically limited small amounts of titanium dioxide, silicon oxide, aluminum oxide, at least one element selected from the group consisting of rare earth elements, yttrium, bismuth, antimony, niobium, tantalum and tungsten, at least one element selected from the group consisting of manganese, copper, iron and chromium, and zinc oxide. The ceramics are low in the variance of electric resistance values and have a low water absorption and hence are low in the change of electric properties due to the lapse of time.

3 Claims, No Drawings

BARIUM TITANATE SERIES CERAMICS HAVING A POSITIVE TEMPERATURE COEFFICIENT OF ELECTRIC RESISTANCE

BACKGROUND OF THE INVENTION (1) Field of the Invention

The present invention relates to barium titanate series semiconductive ceramics having a positive temperature coefficient of electric resistance (hereinafter, ceramics having a positive temperature coefficient of electric resistance are referred to as PTC ceramics), which can be produced from inexpensive industrial raw materials, are low in the variance of electric resistance, have a low water absorption and hence are low in the change of electric properties due to the lapse of time.

(2) Description of the Prior Art

It has hitherto been known that barium titanate series semiconductive PTC ceramics can be obtained by sintering a barium titanate series compound together with a very small amount of an oxide of rare earth elements, such as lanthanum (La), cerium (Ce), samarium (Sm) and the like, an oxide of trivalent or pentavalent materials, such as bismuth (Bi), antimony (Sb), niobium (Nb) and the like, or an oxide, such as $Ag_2O$, $SiO_2$, $B_2O_3$, $Al_2O_3$ or the like.

However, the use of inexpensive industrial raw materials containing an impurity element, such as Li, Na, K or the like, which hinders the conversion of barium titanate series ceramic composition into semiconductor, in the production of these barium titanate series semiconductive ceramics has the following drawbacks. That is, barium titanate series semiconductive ceramics cannot be produced stably due to the influence of the impurity, the production of barium titanate series semiconductive ceramics having a uniform electric resisrance is difficult due to the difference of properties of barium carbonate and titanium dioxide used as main raw materials in different lots, and the resulting semiconductive ceramics have a high water absorption and hence are noticeable in the change of properties due to the lapse of time. Particularly, the use of inexpensive industrial raw materials containing the above described impurity elements is not suitable for the production of a large amount of PTC ceramics having a large heat release value, which are known as a honeycomb structural heater (U.S. Pat. No. 3,927,300).

SUMMARY OF THE INVENTION

The present invention aims to overcome the above described drawbacks and to provide PTC ceramics, which consist mainly of a barium titanate series compound and have a predetermined withstand voltage necessary for the use as a heater.

The feature of the present invention is the provision of barium titanate series ceramics having a positive temperature coefficient of electric resistance, consisting of (a) 0.003–0.05 mole, preferably 0.005–0.03 mole, more preferably 0.015–0.025 mole, of titanium dioxide ($TiO_2$), (b) 0.005–0.05 mole, preferably 0.01–0.03 mole, more preferably 0.015–0.025 mole, silicon oxide ($SiO_2$), (c) 0.003–0.07 mole, preferably 0.01–0.05 mole, more preferably 0.02–0.03 mole, of aluminum oxide ($Al_2O_3$), (d) 0.0014–0.008 mole, preferably 0.004–0.0065 mole, more preferably 0.005–0.006 mole, of at least one element selected from the group consisting of rare earth elements, yttrium (Y), bismuth (Bi), antimony (Sb), niobium (Nb), tantalum (Ta) and tungsten (W), (e) 0.00025–0.002 mole, preferably 0.0003–0.0015 mole, more preferably 0.0005–0.0008 mole, of at least one element selected from the group consisting of manganese (Mn), copper (Cu), iron (Fe) and chromium (Cr), (f) 0.0001–0.003 mole, preferably 0.0003–0.002 mole, more preferably 0.0005–0.001 mole, of zinc oxide, and (g) $[1-((a)+(b)+(c)+(d)+(e)+(f))]$ mole of a barium titanate series compound.

provided that the number of moles given by $(d)-((e)+(f))$ is 0.001–0.00765 mole, preferably 0.003–0.005 mole, more preferably 0.0035–0.0047 mole.

The barium titanate series compound to be used in the present invention includes barium titanate itself and barium titanate, whose barium or titanium is partly substituted by elements, such as strontium, lead, zirconium, tin and the like, which shift the Curie temperature to higher temperature side or to lower temperature side. For example, the barium titanate series compounds are represented by the following chemical formulae, $BaTiO_3$, $Ba_{1-x}Sr_xTiO_3$, $Ba_{1-y}Pb_yTiO_3$, $BaTi_{1-z}Zr_zO_3$, $BaTi_{1-w}Sn_wO_3$, $Ba_{1-x-y}Sr_xPb_yTiO_3$ and the like, wherein x, y, z and w represent x=40 atom%, y≦70 atom%, z≦20 atom% and w≦25 atom%.

In the barium titanate series PTC ceramics of the present invention, $TiO_2$ serves to lower the firing temperature of the ceramic composition and to convert stably the ceramic composition into a semiconductor. When the amount of $TiO_2$ is less than 0.003 mole, the effect of $TiO_2$ does not appear, while when the amount is more than 0.05 mole, the resulting ceramics become insulating materials. Therefore, the amount of $TiO_2$ should be limited to 0.003–0.05 mole.

$Al_2O_3$ is used in an amount of 0.003–0.07 mole. $Al_2O_3$ serves to lower the firing temperature, to shift the maximum resistance-giving temperature in the resistance-temperature property curve of the ceramics to higher temperature side, and further to suppress the influence of alkali metals, such as K, Na, Li and the like, which are contained in the raw materials and hinder the conversion of the ceramic composition into a semiconductor. When the amount of $Al_2O_3$ is less than 0.003 mole, the effect of $Al_2O_3$ does not appear, while when the amount exceeds 0.07 mole, the ceramic composition is difficult to be stably converted into a semiconductor, or the resulting semiconductive ceramics are low in the rate of change of electric resistance corresponding to temperature change.

$SiO_2$ is used in an amount of 0.005–0.05 mole. $SiO_2$ serves to produce ceramics having a high resistance against high voltage and to increase the rate of change of electric resistance value of the resulting ceramics corresponding to temperature change. When the amount of $SiO_2$ is less than 0.005 mole, the effect of $SiO_2$ does not appear, while when the amount is more than 0.05 mole, the ceramic composition is difficult to be stably converted into a semiconductor, or the resulting semiconductive ceramics have a water absorption of higher than 1%, and further the ceramic composition has a low melting point and hence the composition is easily fused at the firing.

At least one of rare earth elements and elements of Y, Bi, Sb, Nb, Ta and W, which promote the conversion of the ceramic composition into a semiconductor by the control of the valence, is used in an amount of 0.0014–0.008 mole in total. These elements serve to produce stable semiconductive ceramics. When the amount of these elements is less than 0.0014 mole, the effect of these elements does not appear, while when the amount exceeds 0.008 mole, the resulting ceramics have a very high specific resistance at room temperature or the ceramic composition is difficult to be converted into a stable semiconductor.

At least one of elements of Mn, Cu, Fe and Cr is used in an amount of 0.00025–0.002 mole in total. These elements serve to produce ceramics having a low water absorption and a high withstand voltage and further to make the resulting PTC ceramics more homogeneous. When the amount of these elements is less than 0.00025 mole, the effect of these elements does not appear, while when the amount exceeds 0.002 mole, ceramics having stable properties cannot be obtained or the resulting ceramics convert into insulating materials.

The rare earth elements and the elements of Mn, Cu and the like can be used in the form of an oxide or in the form of a salt thereof or an aqueous solution of the salt, which can be converted into an oxide by calcination or firing. For example, manganese can be used in the form of an aqueous solution of manganese sulfate.

Zinc oxide is used in an amount of 0.0001–0.003 mole. Zinc oxide serves to decrease the water absorption and the variance of resistance values in the resulting ceramics. When the amount of zinc oxide is less than 0.0001 mole, the above described effect of zinc oxide does not appear. While, when the amount exceeds 0.003 mole, the resulting ceramics are low in the water absorption, but are high in the specific resistance value at room temperature and are low in the withstand voltage.

In the present invention, the element (d), which promotes the conversion of ceramic composition into semiconductor by the control of the valence, the element (e), which hinders the conversion of ceramic composition into semiconductor but serves to make the resulting ceramics more homogeneous, and zinc oxide (f) must be used in such relative amounts that the number of moles given by (d)−((e)+(f)) is within the range of 0.001–0.00765 mole. When the number of moles given by (d)−((e)+(f)) is less than 0.001 mole or exceeds 0.00765 mole, the specific resistance of the resulting PTC ceramics is higher than $10^5$–$10^6$ Ω·cm and the ceramics cannot be practically used as a semiconductor. A particularly preferable range of number of moles given by (d)−((e)+(f)), which gives a semiconductor having a specific resistance of lower than $10^3$ Ω·cm, is 0.003–0.005 mole.

The following examples are given for the purpose of illustration of this invention and are not intended as limitations thereof.

$BaCO_3$, $TiO_2$, PbO, $SiO_2$, $Al_2O_3$, $Sb_2O_3$, an aqueous solution of manganese sulfate, and ZnO, were weighed so that the resulting mixtures had a composition shown in the following Table 1, and each of the mixtures was mixed and dried in a conventional manner, and then calcined at 1,050° C. for 3 hours and further fired at 1,300° C. for 2 hours to obtain barium titanate series semiconductive PTC ceramics having a diameter of 18 mm and a thickness of 2.5 mm. Among the resulting PTC ceramics, only the PTC ceramics having a composition defined in the present invention satisfy all the following properties, that is, not higher than 1% of water absorption, not higher than $10^5$ Ω·cm of specific resistance after provided with ohmic electrodes, not more than 35% of variance of specific resistance, not lower than 200 V of withstand voltage against breakdown, not higher than 40% of rate of change of specific resistance after repeating 8,000 times of cycles, each cycle consisting of 100 V application for 1 minute and non-application of voltage for 4 minutes, as shown in Table 1.

When rare earth elements, such as La, Y and the like, were used in place of Sb as a component for promoting the conversion of ceramic composition into semiconductor by the control of the valence, the same result was obtained as well. When Cu, Fe or Cr was used in place of Mn in order to make the resulting PTC ceramics more homogeneous, a good result was obtained as illustrated in Examples 19–21 as well. Further, when the amount of element, which shifts the Curie temperature, was changed, the resulting ceramics as well were satisfactory in the properties aimed in the present invention as illustrated in Examples 22–26 and Comparative examples 13 and 14.

TABLE 1-1

| | Barium titanate series compound | $TiO_2$ | $SiO_2$ | $Al_2O_3$ | (d) | (e) | ZnO (f) | d−(e+f) | Water absorption (%) | Specific resistance (Ω·cm) | Variance of specific resistance (%) | Withstand voltage (V) | Rate of change of specific resistance (%) |
|---|---|---|---|---|---|---|---|---|---|---|---|---|---|
| Comparative example 1 | $Ba_{0.84}Pb_{0.16}TiO_3$ | 0 | 0.02* | 0.022 | Sb0.005 | Mn0.0005 | 0.001 | 0.0035 | 1.1 | 310 | 46 | 200 | 73 |
| Example 1 | $Ba_{0.84}Pb_{0.16}TiO_3$ | 0.003 | 0.02 | 0.022 | 0.005 | 0.0005 | 0.001 | 0.0035 | 0.4 | 82 | 31 | 270 | 13 |
| Example 2 | $Ba_{0.84}Pb_{0.16}TiO_3$ | 0.02 | 0.02 | 0.022 | 0.005 | 0.0005 | 0.001 | 0.0035 | 0.3 | 120 | 24 | 350 | 10 |
| Example 3 | $Ba_{0.84}Pb_{0.16}TiO_3$ | 0.05 | 0.02 | 0.022 | 0.005 | 0.0005 | 0.001 | 0.0035 | 0.9 | 530 | 22 | 230 | 17 |
| Comparative example 2 | $Ba_{0.84}Pb_{0.16}TiO_3$ | 0.07 | 0.02 | 0.022 | 0.005 | 0.0005 | 0.001 | 0.0035 | — | $10^6<$ | — | — | — |
| Comparative example 3 | $Ba_{0.84}Pb_{0.16}TiO_3$ | 0.02 | 0 | 0.022 | 0.005 | 0.0005 | 0.001 | 0.0035 | 0.1 | 15 | 18 | 120 | 7 |
| Example 4 | $Ba_{0.84}Pb_{0.16}TiO_3$ | 0.02 | 0.005 | 0.022 | 0.005 | 0.0005 | 0.001 | 0.0035 | 0.1 | 24 | 18 | 240 | 9 |
| Example 5 | $Ba_{0.84}Pb_{0.16}TiO_3$ | 0.02 | 0.018 | 0.022 | 0.005 | 0.0005 | 0.001 | 0.0035 | 0.2 | 105 | 23 | 330 | 12 |
| Example 6 | $Ba_{0.84}Pb_{0.16}TiO_3$ | 0.02 | 0.05 | 0.022 | 0.005 | 0.0005 | 0.001 | 0.0035 | 1.0 | 930 | 33 | 500 | 40 |
| Comparative example 4 | $Ba_{0.84}Pb_{0.16}TiO_3$ | 0.02 | 0.08 | 0.022 | 0.005 | 0.0005 | 0.001 | 0.0035 | 2.3 | $10^5<$ | — | — | — |
| Comparative example 5 | $Ba_{0.84}Pb_{0.16}TiO_3$ | 0.02 | 0.02 | 0 | 0.005 | 0.0005 | 0.001 | 0.0035 | 1.8 | $10^6<$ | — | — | — |
| Example 7 | $Ba_{0.84}Pb_{0.16}TiO_3$ | 0.02 | 0.02 | 0.003 | 0.005 | 0.0005 | 0.001 | 0.0035 | 1.0 | 3400 | 31 | 540 | 27 |
| Example 8 | $Ba_{0.84}Pb_{0.16}TiO_3$ | 0.02 | 0.02 | 0.02 | 0.005 | 0.0005 | 0.001 | 0.0035 | 0.3 | 130 | 23 | 310 | 13 |

TABLE 1-1-continued

| | Barium titanate series compound | $TiO_2$ | $SiO_2$ | $Al_2O_3$ | (d) | (e) | ZnO (f) | d−(e+f) | Water absorption (%) | Specific resistance (Ω·cm) | Variance of specific resistance (%) | Withstand voltage (V) | Rate of change of specific resistance (%) |
|---|---|---|---|---|---|---|---|---|---|---|---|---|---|
| Example 9 | $Ba_{0.84}Pb_{0.16}TiO_3$ | 0.02 | 0.02 | 0.07 | 0.005 | 0.0005 | 0.001 | 0.0035 | 0.4 | 290 | 25 | 320 | 9 |

TABLE 1-2

| | Barium titanate series compound | $TiO_2$ | $SiO_2$ | $Al_2O_3$ | (d) | (e) | ZnO (f) | d−(e+f) | Water absorption (%) | Specific resistance (Ω·cm) | Variance of specific resistance (%) | Withstand voltage (V) | Rate of change of specific resistance (%) |
|---|---|---|---|---|---|---|---|---|---|---|---|---|---|
| Comparative example 6 | $Ba_{0.84}Pb_{0.16}TiO_3$ | 0.02 | 0.02 | 0.09 | Sb0.005 | Mn0.0005 | 0.001 | 0.0035 | 0.2 | $10^5<$ | — | — | — |
| Comparative example 7 | $Ba_{0.84}Pb_{0.16}TiO_3$ | 0.02 | 0.02 | 0.022 | 0 | 0.0005 | 0.001 | — | — | $10^6<$ | — | — | — |
| Example 10 | $Ba_{0.84}Pb_{0.16}TiO_3$ | 0.02 | 0.02 | 0.022 | 0.003 | 0.0005 | 0.001 | 0.0015 | 0.1 | 570 | 34 | 380 | 17 |
| Example 11 | $Ba_{0.84}Pb_{0.16}TiO_3$ | 0.02 | 0.02 | 0.022 | 0.006 | 0.0005 | 0.001 | 0.0045 | 0.4 | 110 | 21 | 330 | 12 |
| Example 12 | $Ba_{0.84}Pb_{0.16}TiO_3$ | 0.02 | 0.02 | 0.022 | 0.008 | 0.0005 | 0.001 | 0.0065 | 0.9 | 2700 | 35 | 400 | 26 |
| Comparative example 8 | $Ba_{0.84}Pb_{0.16}TiO_3$ | 0.02 | 0.02 | 0.022 | 0.012 | 0.0005 | 0.001 | 0.0105 | — | $10^6<$ | — | — | — |
| Comparative example 9** | $Ba_{0.84}Pb_{0.16}TiO_3$ | 0.02 | 0.02 | 0.022 | 0.005 | 0 | 0.001 | 0.004 | 0.7 | 1800 | 71 | 300 | 25 |
| Example 13 | $Ba_{0.84}Pb_{0.16}TiO_3$ | 0.02 | 0.02 | 0.022 | 0.005 | 0.0003 | 0.001 | 0.0037 | 0.5 | 84 | 30 | 310 | 13 |
| Example 14 | $Ba_{0.84}Pb_{0.16}TiO_3$ | 0.02 | 0.02 | 0.022 | 0.005 | 0.001 | 0.001 | 0.003 | 0.3 | 210 | 24 | 470 | 12 |
| Example 15 | $Ba_{0.84}Pb_{0.16}TiO_3$ | 0.02 | 0.02 | 0.022 | 0.005 | 0.002 | 0.001 | 0.002 | 0.2 | 1600 | 19 | 520 | 12 |
| Comparative example 10 | $Ba_{0.84}Pb_{0.16}TiO_3$ | 0.02 | 0.02 | 0.022 | 0.005 | 0.0035 | 0.001 | 0.0005 | 0.2 | $10^5<$ | — | — | — |
| Comparative example 11*** | $Ba_{0.84}Pb_{0.16}TiO_3$ | 0.02 | 0.02 | 0.022 | 0.005 | 0.0005 | 0 | 0.0045 | 1.4 | 120 | 83 | 260 | 10 |
| Example 16 | $Ba_{0.84}Pb_{0.16}TiO_3$ | 0.02 | 0.02 | 0.022 | 0.005 | 0.0005 | 0.0001 | 0.0044 | 0.8 | 140 | 33 | 290 | 12 |

TABLE 1-3

| | Barium titanate series compound | $TiO_2$ | $SiO_2$ | $Al_2O_3$ | (d) | (e) | ZnO (f) | d−(e+f) | Water absorption (%) | Specific resistance (Ω·cm) | Variance of specific resistance (%) | Withstand voltage (V) | Rate of change of specific resistance (%) |
|---|---|---|---|---|---|---|---|---|---|---|---|---|---|
| Example 17 | $Ba_{0.84}Pb_{0.16}TiO_3$ | 0.02 | 0.02 | 0.022 | Sb0.005 | Mn0.0005 | 0.0015 | 0.003 | 0.3 | 150 | 20 | 300 | 11 |
| Example 18 | $Ba_{0.84}Pb_{0.16}TiO_3$ | 0.02 | 0.02 | 0.022 | 0.005 | 0.0005 | 0.003 | 0.0015 | 0.2 | 380 | 16 | 270 | 11 |
| Comparative example 12 | $Ba_{0.84}Pb_{0.16}TiO_3$ | 0.02 | 0.02 | 0.022 | 0.005 | 0.0005 | 0.005 | — | 0.1 | 2700 | 19 | 180 | 16 |
| Example 19 | $Ba_{0.84}Pb_{0.16}TiO_3$ | 0.02 | 0.02 | 0.022 | 0.005 | Cu0.0005 | 0.001 | 0.0035 | 0.3 | 110 | 21 | 310 | 11 |
| Example 20 | $Ba_{0.84}Pb_{0.16}TiO_3$ | 0.02 | 0.02 | 0.022 | 0.005 | Fe0.001 | 0.001 | 0.003 | 0.3 | 130 | 24 | 290 | 11 |
| Example 21 | $Ba_{0.84}Pb_{0.16}TiO_3$ | 0.02 | 0.02 | 0.022 | 0.005 | Cr0.001 | 0.001 | 0.003 | 0.3 | 110 | 23 | 290 | 10 |
| Comparative example 13*** | $Ba_{0.95}Pb_{0.05}TiO_3$ | 0.02 | 0.027 | 0.022 | 0.005 | Mn0.0005 | 0 | 0.0045 | 1.4 | 820 | 55 | 440 | 47 |
| Example 22 | $Ba_{0.95}Pb_{0.05}TiO_3$ | 0.02 | 0.027 | 0.022 | 0.005 | 0.0005 | 0.0001 | 0.0044 | 0.9 | 110 | 35 | 330 | 38 |
| Example 23 | $Ba_{0.95}Pb_{0.05}TiO_3$ | 0.02 | 0.027 | 0.022 | 0.005 | 0.0005 | 0.0005 | 0.004 | 0.8 | 150 | 27 | 370 | 24 |
| Example 24 | $Ba_{0.95}Pb_{0.05}TiO_3$ | 0.02 | 0.027 | 0.022 | 0.005 | 0.0005 | 0.001 | 0.0035 | 0.5 | 140 | 26 | 380 | 17 |
| Example 25 | $Ba_{0.95}Pb_{0.05}TiO_3$ | 0.02 | 0.027 | 0.022 | 0.005 | 0.0005 | 0.002 | 0.0025 | 0.3 | 510 | 22 | 320 | 16 |
| Example 26 | $Ba_{0.95}Pb_{0.05}TiO_3$ | 0.02 | 0.027 | 0.022 | 0.005 | 0.0005 | 0.003 | 0.0015 | 0.1 | 1600 | 22 | 230 | 16 |
| Comparative example 14 | $Ba_{0.95}Pb_{0.05}TiO_3$ | 0.02 | 0.027 | 0.022 | 0.005 | 0.0005 | 0.005 | — | 0.1 | $10^6<$ | — | — | — |

Note:
*All the numerical values mean number of moles. The amount of barium titanate series compound is the remainder when the total amount of the ceramics is calculated as 1 mole.
**A thin insulating layer was formed on the surface of the resulting ceramics, and the electric properties were measured after removing the layer.
***The color of the resulting ceramics was not uniform.

As described above, in the present invention, among the components for forming barium titanate series semiconductive PTC ceramics, that is, among (a) titanium dioxide, (b) silicon oxide, (c) aluminum oxide, (d) a component for promoting the conversion of ceramic composition into semiconductor, (e) a component for making the resulting ceramics homogeneous, (f) zinc oxide and (g) a barium titanate series compound, the amount of zinc oxide is particularly limited, whereby barium titanate series semiconductive PTC ceramics having a low water absorption, which are low in the variance of electric resistance value and in the change of electric properties due to the lapse of time, can be obtained. Moreover, since the relative amounts of the components (d), (e) and (f) are limited so that the number of moles given by (d)−((e)+(f)) lies within the specifically limited range, barium titanate series semiconductive PTC ceramics having a low specific resistance and a low variance of the specific resistance can be stably produced from inexpensive industrial raw materials. The ceramics can be used in various heaters, and are very useful for industrial purpose.

What is claimed is:

1. Barium titanate series ceramics having a positive temperature coefficient of electric resistance, consisting of
   (a) 0.003–0.05 mole of titanium dioxide,
   (b) 0.005–0.05 mole of silicon oxide,
   (c) 0.003–0.07 mole of aluminum oxide,
   (d) 0.0014–0.008 mole of at least one element selected from the group consisting of rare earth elements, yttrium, bismuth, antimony, niobium, tantalum and tungsten,
   (e) 0.00025–0.002 mole of at least one element selected from the group consisting of manganese, copper, iron and chromium,
   (f) 0.0001–0.003 mole of zinc oxide, and
   (g) [1−((a)+(b)+(c)+(d)+(e)+(f))] mole of a barium titanate series compound,
provided that the number of moles given by (d)−((e)+(f)) is 0.001–0.00765 mole.

2. Barium titanate series ceramics having a positive temperature coefficient of electric resistance, consisting of
   (a) 0.005–0.03 mole of titanium dioxide,
   (b) 0.01–0.03 mole of silicon oxide,
   (c) 0.01–0.05 mole of aluminum oxide,
   (d) 0.004–0.0065 mole of at least one element selected from the group consisting of rare earth elements, yttrium, bismuth, antimony, niobium, tantalum and tungsten,
   (e) 0.0003–0.0015 mole of at least one element selected from the group consisting of manganese, copper, iron and chromium,
   (f) 0.0003–0.002 mole of zinc oxide, and
   (g) [1−((a)+(b)+(c)+(d)+(e)+(f))] mole of a barium titanate series compound,
provided that the number of moles given by (d)−((e)+(f)) is 0.003–0.005 mole.

3. Barium titanate series ceramics having a positive temperature coefficient of electric resistance, consisting of
   (a) 0.015–0.025 mole of titanium dioxide,
   (b) 0.015–0.025 mole of silicon oxide,
   (c) 0.02–0.03 mole of aluminum oxide,
   (d) 0.005–0.006 mole of at least one element selected from the group consisting of rare earth elements, yttrium, bismuth, antimony, niobium, tantalum and tungsten,
   (e) 0.0005–0.0008 mole of at least one element selected from the group consisting of manganese, copper, iron and chromium,
   (f) 0.0005–0.001 mole of zinc oxide, and
   (g) [1−((a)+(b)+(c)+(d)+(e)+(f))] mole of a barium titanate series compound,
provided that the number of moles given by (d)−((e)+(f)) is 0.0035–0.0047 mole.

* * * * *